(12) United States Patent
Hong et al.

(10) Patent No.: US 9,904,415 B2
(45) Date of Patent: Feb. 27, 2018

(54) INTERACTIVE PROJECTION DISPLAY SYSTEM AND INPUT DEVICE THEREOF

(71) Applicant: EVEREST DISPLAY INC., Hsinchu (TW)

(72) Inventors: Hei Tai Hong, Hsinchu (TW); Fu Hsiung Lee, Hsinchu (TW); Sing Wu, Taoyuan (TW); Wan Yu Hong, Hsinchu (TW); Yueh Hong Shih, Hsinchu (TW); Shih Chieh Lu, Hsinchu (TW)

(73) Assignee: EVEREST DISPLAY INC., Hsinchu (TW)

( * ) Notice: Subject to any disclaimer, the term of this patent is extended or adjusted under 35 U.S.C. 154(b) by 191 days.

(21) Appl. No.: 14/580,412

(22) Filed: Dec. 23, 2014

(65) Prior Publication Data

US 2015/0177853 A1  Jun. 25, 2015

(30) Foreign Application Priority Data

Dec. 25, 2013 (TW) .............................. 102148167 A (51) Int. Cl.
*G06F 3/042* (2006.01)
*G06F 3/033* (2013.01)
(Continued)

(52) U.S. Cl.
CPC ............ *G06F 3/0425* (2013.01); *G06F 3/033* (2013.01); *G06F 3/03545* (2013.01);
(Continued)

(58) Field of Classification Search
CPC ...... G06F 3/033; G06F 3/0386; G06F 3/0425; G06F 3/0308; G06F 3/0325; G06F 3/03545; H04N 5/74
See application file for complete search history.

(56) References Cited

U.S. PATENT DOCUMENTS 5,738,429 A * 4/1998 Tagawa ................ G03B 21/132
353/122
6,229,601 B1 * 5/2001 Hasegawa ............. G06F 3/0386
341/5

(Continued)

FOREIGN PATENT DOCUMENTS

TW          200500781 A       1/2005
TW          M360401 U1        7/2009
(Continued)

*Primary Examiner* — Darlene M Ritchie
(74) *Attorney, Agent, or Firm* — Li & Cai Intellectual Property (USA) Office (57) ABSTRACT

An interactive display system includes an input device and an image interaction module. The input device has a touch portion including a built-in first light-emitting module and a built-in second light-emitting module. The image interaction module includes a display module, a first image-capturing module, a second image-capturing module and a processing module. The processing module captures invisible light generated by the first light-emitting module through the first image-capturing module, for determining and obtaining the position of the touch portion. The processing module captures visible light generated by the second light-emitting module through the second image-capturing module according to the position of the touch portion, for determining and obtaining a predetermined color light source provided by the visible light generated by the second light-emitting module.

10 Claims, 6 Drawing Sheets

(51) Int. Cl.
*G06F 3/0354* (2013.01)
*G06F 3/03* (2006.01)
*G06F 3/038* (2013.01)

(52) U.S. Cl.
CPC .......... *G06F 3/0308* (2013.01); *G06F 3/0383* (2013.01); *G06F 3/0386* (2013.01)

(56) References Cited

U.S. PATENT DOCUMENTS

| | | | | | |
|---|---|---|---|---|---|
| 6,275,214 | B1* | 8/2001 | Hansen | .................. | G06F 3/0386 345/156 |
| 7,502,018 | B2* | 3/2009 | Tamura | .................. | G06F 3/0418 178/19.01 |
| 7,768,505 | B2* | 8/2010 | Ishihara | .............. | G06F 3/03545 178/18.09 |
| 8,089,455 | B1* | 1/2012 | Wieder | .................. | G06F 3/0386 345/156 |
| 9,329,716 | B2* | 5/2016 | Parham | .................. | G06F 3/0414 |
| 2001/0022861 | A1* | 9/2001 | Hiramatsu | ............ | G06F 3/0425 382/291 |
| 2003/0169233 | A1* | 9/2003 | Hansen | .................. | G06F 3/0386 345/158 |
| 2004/0169639 | A1* | 9/2004 | Pate | ...................... | G06F 3/0386 345/157 |
| 2008/0169132 | A1* | 7/2008 | Ding | ...................... | G06F 3/0433 178/19.02 |
| 2010/0013801 | A1* | 1/2010 | Kondo | ................... | G03B 21/26 345/179 |
| 2012/0032880 | A1* | 2/2012 | Kim | ....................... | G06F 3/0386 345/157 |
| 2012/0299823 | A1* | 11/2012 | Katsumata | ............ | G06F 3/0386 345/156 |
| 2013/0063401 | A1* | 3/2013 | Ouchida | .............. | H04N 9/3179 345/175 |
| 2013/0093666 | A1* | 4/2013 | Nagai | ....................... | G06F 3/01 345/156 |
| 2013/0300658 | A1* | 11/2013 | Endo | ...................... | G06F 3/0425 345/157 |
| 2014/0285475 | A1* | 9/2014 | Ogata | ...................... | G06F 3/03545 345/175 |
| 2015/0049063 | A1* | 2/2015 | Smith | ................... | G06F 3/0421 345/175 |
| 2015/0153841 | A1* | 6/2015 | Fang | ...................... | G06F 3/0304 345/156 |

FOREIGN PATENT DOCUMENTS

| | | |
|---|---|---|
| TW | 201218022 A1 | 5/2012 |
| TW | 201222424 A1 | 6/2012 |
| TW | 201437849 A | 10/2014 |

* cited by examiner

INTERACTIVE PROJECTION DISPLAY SYSTEM AND INPUT DEVICE THEREOF

BACKGROUND OF THE INVENTION

1. Field of the Invention

The instant disclosure relates to an interactive display system and an input device thereof, particularly to an interactive display system and an input device thereof that make a motion trajectory of a touch portion of the input device upon a projection screen correspondingly displayed as images.

2. Description of Related Art

With the technology well developed, the dependence on the electric products has gradually increased in our daily lives. Laptops, mobile phones, digital players, optical projectors and the like have been essential tools in this generation. The above electric products all have an input interface for a user to input an instruction and the instruction will be automatically executed by the operation system inside the electric products.

Nowadays, desktop computers, laptops and other similar host devices can't be more important in our work or study. Moreover, because more and more presentation software have been published, people often save the edited presentation information in their host devices in advance and then show the saved presentation information as displayed images via their host devices. In order to display the presentation information for plenty of audiences, a projector that is electrically connected to the host device is often used so as to project images on the projection screen to generate projecting images. Thereby, via the projector, speakers or lecturers can have the presentation information show for the audiences effectively and vividly, and also the audiences can discuss on and ask questions about the presentation information more conveniently.

SUMMARY OF THE INVENTION

The disclosed embodiments include an interactive display system and an input device thereof.

One interactive display system provided by a disclosed embodiment comprises at least an input device and an image interaction module. The input device has a touch portion and the touch portion has at least one built-in first light-emitting module for generating invisible light and at least one built-in second light-emitting module for generating visible light. The image interaction module comprises a display module, a first image-capturing module, a second image-capturing module and a processing unit. The first image-capturing module captures the invisible light generated by the first light-emitting module, the second image-capturing module captures the visible light generated by the second light-emitting module and the processing module is coupled to the first image-capturing module and the second image-capturing module. The processing module captures the invisible light generated by the first light-emitting module via the first image-capturing module so as to determine and obtain a position of the touch portion of the input device. Also, the processing module captures the visible light generated by the second light-emitting module via the second image-capturing module according to the position of the touch portion, so as to determine and obtain a predetermined color light source provided by the visible light generated by the second light-emitting module. Finally, the display module projects a specific function onto a projection screen according to the predetermined color light source and a motion trajectory of the touch portion of the input device on the projection screen.

One input device provided by a disclosed embodiment is used in an image interaction module to form an interactive display system. The image interaction module comprises a display module, a first image-capturing module, a second image-capturing module, and a processing module coupled to the first image-capturing module and the second image-capturing module. The input device is characterized as follows. The input device has a touch portion, and the touch portion has at least one built-in first light-emitting module for generating invisible light and at least one built-in second light-emitting module for generating visible light. The processing module captures the invisible light generated by the first light-emitting module via the first image-capturing module so as to determine and obtain a position of the touch portion of the input device. Also, the processing module captures the visible light generated by the second light-emitting module via the second image-capturing module according to the position of the touch portion, so as to determine and obtain a predetermined color light source provided by the visible light generated by the second light-emitting module. Finally, the display module projects a specific function onto a projection screen according to the predetermined color light source and a motion trajectory of the touch portion of the input device on the projection screen.

To sum up, because of the features that "the touch portion has at least one built-in first light-emitting module for generating invisible light and at least one built-in second light-emitting module for generating visible light" and that "the image interaction module comprises a first image-capturing module for capturing the invisible light generated by the first light-emitting module and a second image-capturing module for capturing the visible light generated by the second light-emitting module", according to "a predetermined color light source provided by the visible light generated by the second light-emitting module" and "a motion trajectory of the touch portion of the input device on the projection screen", the display module of the image interaction module projects a specific function corresponding to "the predetermined color light source provided by the touch portion" and "the motion trajectory of the touch portion" onto the projection screen in the interactive display system and the input device thereof provided by the instant disclosure. For example, the specific function is track images corresponding to the predetermined color light source.

For further understanding of the instant disclosure, reference is made to the following detailed description illustrating the embodiments and examples of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

The aforementioned illustrations and following detailed descriptions are exemplary for the purpose of further explaining the scope of the instant disclosure. Other objectives and advantages related to the instant disclosure will be illustrated in the subsequent descriptions and appended drawings. The following description is going to illustrate an interactive display system and an input device thereof provided by the instant disclosure with figures; however, it is not restricted by the embodiments below. It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below could be termed a second element, component, region, layer or section without departing from the teachings of the instant disclosure. As used herein, the term "and/or" includes any and all combinations of one or more of the associated listed items.

[One Embodiment of the Interactive Display System]

Figure 1:
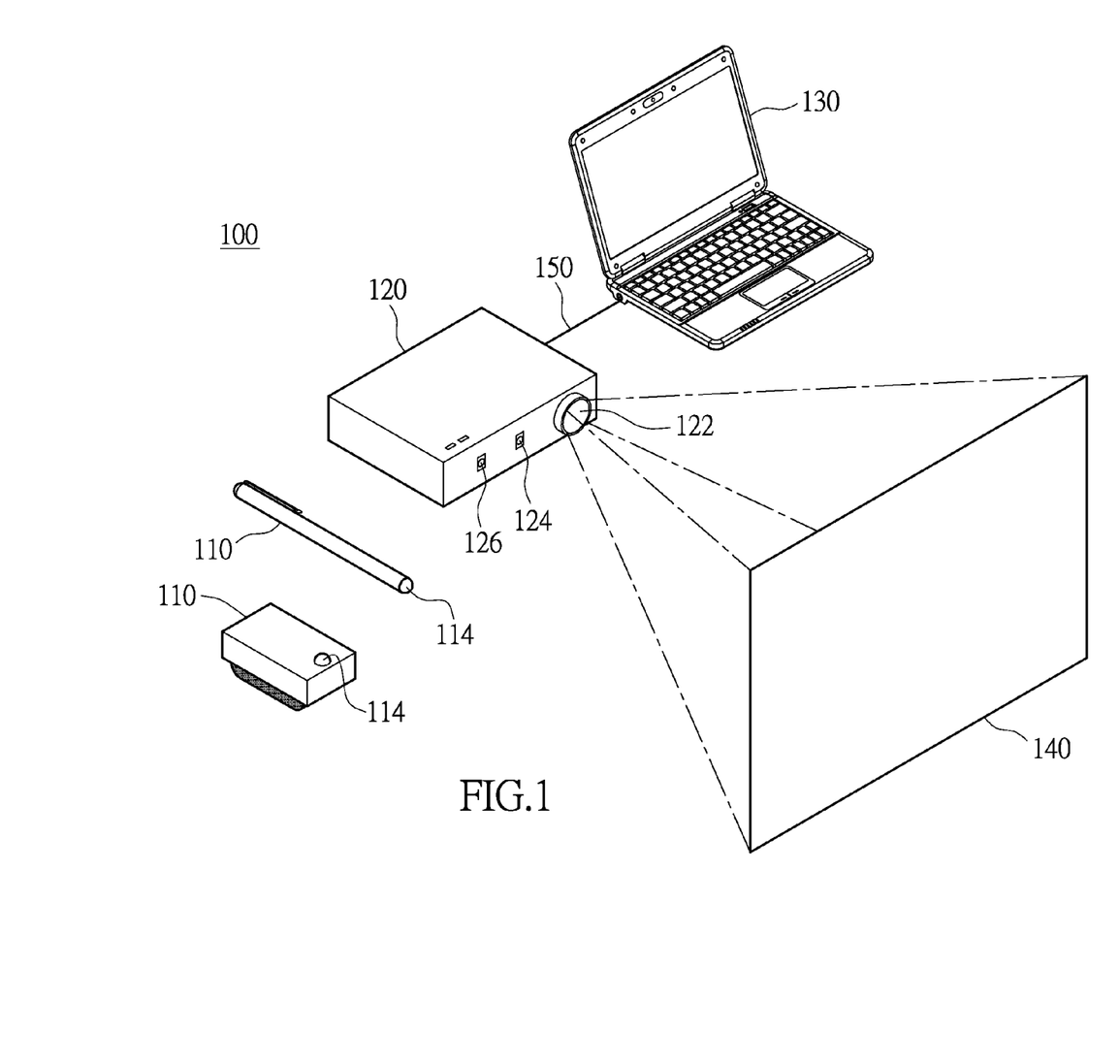
FIG. 1 shows a schematic diagram of an interactive display system according to an embodiment of the instant disclosure.
Figure 2:
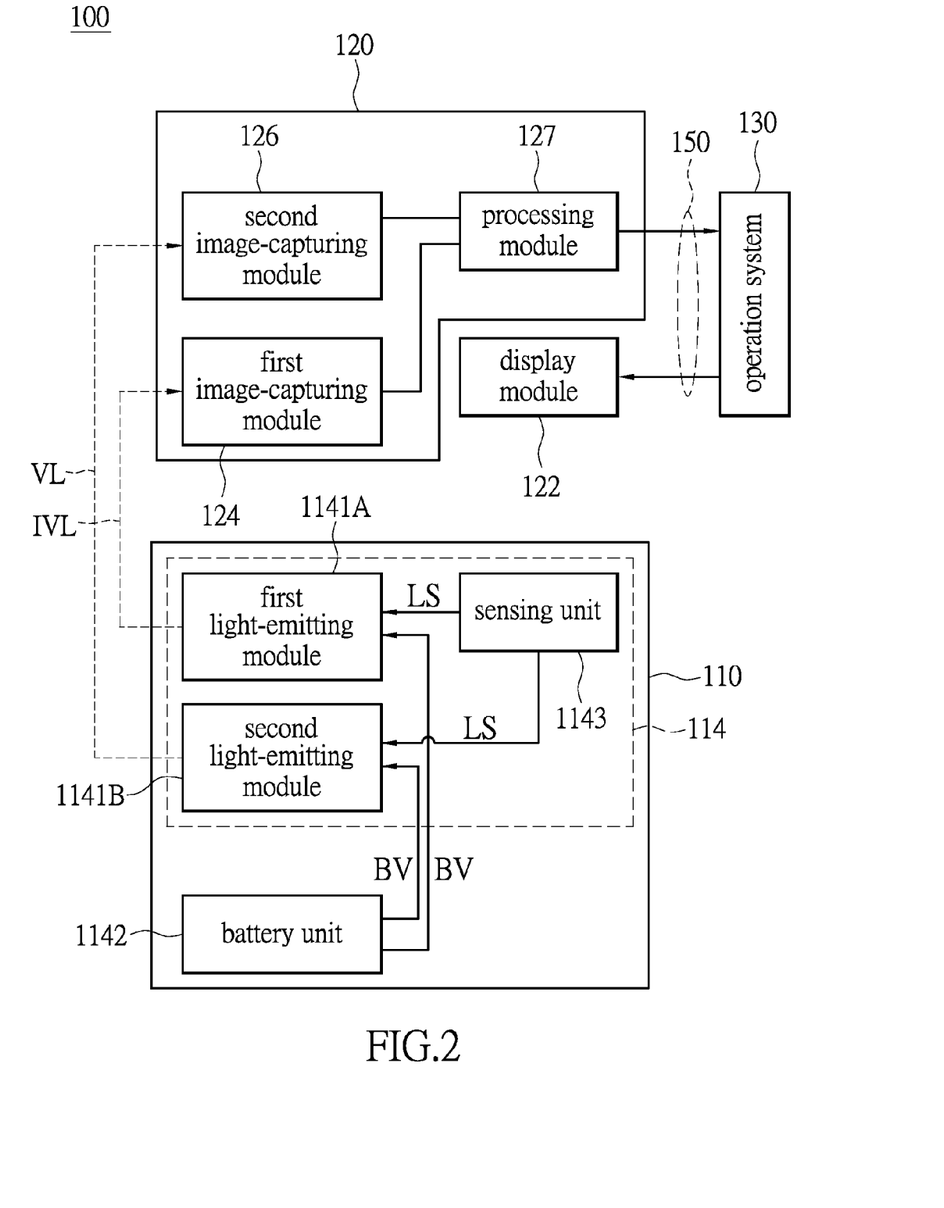
FIG. 2 shows a function block diagram of an interactive display system according to an embodiment of the instant disclosure.
Figure 3:
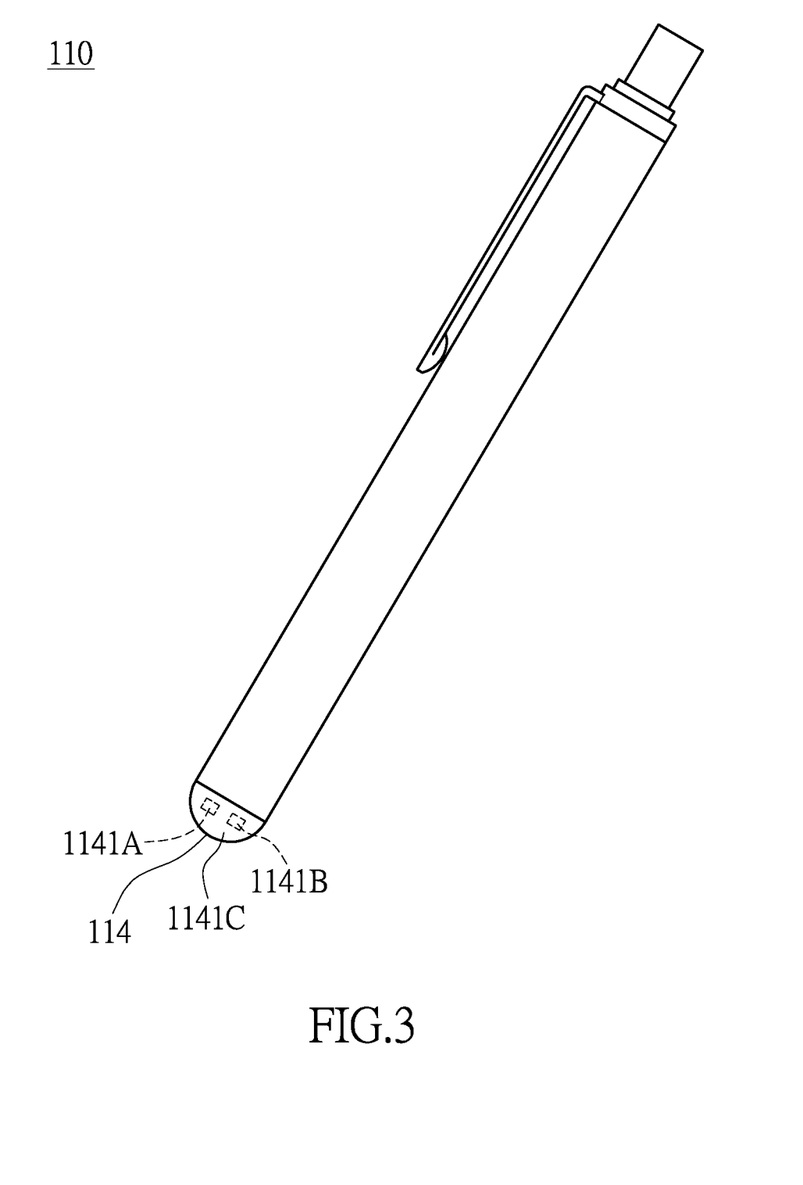
FIG. 3 shows a schematic diagram of a pen-shaped input device according to an embodiment of the instant disclosure.
Figure 4:
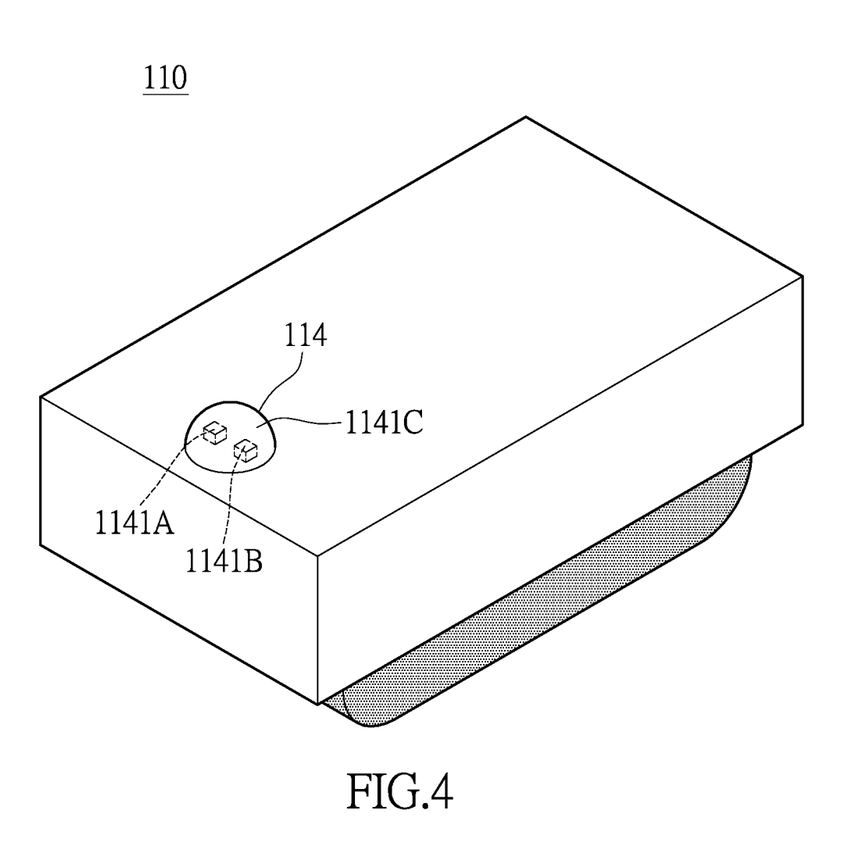
FIG. 4 shows a schematic diagram of an eraser-shaped input device according to an embodiment of the instant disclosure.

Please refer to FIGS. 1-4, FIG. 1 shows a schematic diagram of an interactive display system according to an embodiment of the instant disclosure, FIG. 2 shows a function block diagram of an interactive display system according to an embodiment of the instant disclosure, FIG. 3 shows a schematic diagram of a pen-shaped input device according to an embodiment of the instant disclosure, and FIG. 4 shows a schematic diagram of an eraser-shaped input device according to an embodiment of the instant disclosure.

The interactive display system 100 comprises M input devices 110 and M image interaction modules 120, wherein M is a positive integer larger than 1. FIG. 1 shows the practical operation environment and thus there are only one pen-shaped input device and one eraser-shaped shown, but it is not limited thereto. Each input device 110 comprises a touch portion 114 and at least two built-in light-emitting modules inside the touch portion 114. The touch portion 114 is configured at one terminal of the input device 110, and the two light-emitting modules include a first light-emitting module 1141A used to generate invisible light IVL and a second light-emitting module 1141B used to generate visible light VL, but it is not limited thereto. The image interaction module 120 comprises a display module 122, a first image-capturing module 124, a second image-capturing module 126 and a processing module 127. The first image-capturing module 124 and the second image-capturing module 126 captures the invisible light IVL generated by the first light-emitting module 1141A and the visible light VL generated by the second light-emitting module 1141B, respectively. In addition, the processing module 127 is coupled to the first image-capturing module 124 and the second image-capturing module 126. The display module 122 connects to an operation system 130 via a transmission channel 150. In details, information is transmitted between the operation system 130 and the image interaction module 120 via the transmission channel 150, such that screen images of the saved information in the operation system 130 are projected onto a projection screen 140 via the image interaction module 120 so as to display corresponding projected images. Generally, the projection screen 140 is arranged in front of the display module 122 of the image interaction module 120, and the background of the projection screen 140 is white so that the image interaction module 120 can generate projected images onto the projection screen 140. The projection screen 140 does not have an actual interaction with other elements and can be just a plane for projection so the projection screen 140 is not shown in the function block diagram of FIG. 2. However, it does not mean there is no need to have the projection screen 140 in the interactive display system 100.

Moreover, the display module 122 is connected to the operation system 130 via the transmission channel 150 so as to receive the screen images of the operation system 130, and the display module 122 projects the screen images of the operation system 130 onto the projection screen 140 to generate projected images. The transmission channel 150 can be a transmission cable or a wireless transmission channel satisfied with wireless communication protocol. For example, as a signal connection between the image interaction module 120 and the operation system 130 is a wired electrical connection, the operation system 120 has an image transmission wire (not shown) and the operation system 130 has a port corresponding to the image transmission wire (not shown), such as a VGA port or a HDMI port. The image transmission wire plugs into the port so the operation system 130 is electrically connected to the image interaction module 120, and electrical signals are further transmitted to the image interaction module 120. As a signal connection between the image interaction module 120 and the operation system 130 is a wireless electrical connection, the image interaction module 120 and the operation system 130 are connected wirelessly via Bluetooth or wireless net. Thereby, the image interaction module 120 receives wireless signals from the operation system 130 and displays images corresponding to the wireless signals onto the projection screen 140. The wireless signals can be radio frequency signals (RF signals), wherein the typically available frequency ranges are a low-frequency range 30 KHz-300 KHz, a medium-frequency range 300 KHz-3 MHz and a high-frequency range 30 GHz-300 GHz. Additionally, a lower-frequency range 3 KHz-30 KHz or a higher-frequency range 30 GHz-300 GHz are likely to be used depending on needs, and it is not limited thereto.

Specifically, the screen images of the operation system 130 are displayed by a display device electrically connected to the operation system 130 (not shown in FIG. 2) such as a liquid crystal display (LCD), a cathode ray tube (CRT) or the like. In addition, the screen images of the operation system 130 can also be projected onto the projection screen 140 directly via the image interaction module 120. For example, if the operation system 130 is a desktop, instead of electrically connecting the desktop to the crystal display, the user can operates the desktop smoothly and continuously by electrically connecting the desktop to the image interaction module 120 directly, which makes the projected images generated by the image interaction module 120 equal to the screen images of the operation system 130. Therefore, whether to use a display device or not is not restricted herein.

In practice, the first image-capturing module 124 and the second image-capturing module 126 are elements that can sense images and are made of charge coupled device (CCD) or complementary metal oxide semiconductor (CMOS), but it is not limited thereto. In one embodiment, the touch portion 114 of the input device 110 is a light-emitting portion, and the light-emitting portion comprises a first light-emitting module 1141A for generating invisible light IVL (such as an invisible infrared source), a second light-emitting module 1141B for generating visible light VL (such as a visible single color light source), a battery unit 1142 and a sensing unit 1143. Further, the battery unit 1142 is electrically connected to the first light-emitting module 1141A and the second light-emitting module 1141B for providing electrical power BV during operation. The sensing unit 1143 is electrically connected to the first light-emitting module 1141A and the second light-emitting module 1141B for determining whether the input device 110 is very close to the projection screen 140 or directly touches the projection screen 140. For example, in conjunction FIGS. 1-3, when the "touch type" sensing unit 1143 of a pen-shaped input device directly touches the projection screen 140, the sensing unit 1143 transmits light-emitting signals LS to the first light-emitting module 1141A and the second light-emitting module 1141B respectively, so as to trigger the first light-emitting module 1141A and the second light-emitting module 1141B to generate invisible light the IVL and the visible light VL respectively. In conjunction with FIGS. 1, 2 and 4, when the "non-touch type" sensing unit 1143 of an eraser-shaped input device is very close to the projection screen 140, the sensing unit 1143 transmits light-emitting signals LS to the first light-emitting module 1141A and the second light-emitting module 1141B respectively, so as to trigger the first light-emitting module 1141A and the second light-emitting module 1141B to generate the invisible light IVL and the visible light VL respectively. Moreover, the sensing unit 1143 of a pen-shaped input device can also be a "non-touch type" sensing unit, the sensing unit 1143 of an eraser-shaped input device can also be a "touch type" sensing unit, and it is not limited thereto.

In practice, when the interactive display system 100 is in a normal operation mode, the processing module 127 captures the invisible light IVL generated by the first light-emitting module 1141A via the first image-capturing module 124, so as to determine and obtain a position of the touch portion 114 of the input device 110, such as coordinates, and to locate the touch portion 114. At the same time, according to the position of the touch portion 114, the processing module 127 captures the visible light VL generated by the second light-emitting module 1141B via the second image-capturing module 126, so as to determine and obtain a predetermined color light source provided by the visible light VL generated by the second light-emitting module 1141B. Thereby, the display module 122 of the image interaction module 120 projects a specific function (such as track images corresponding to the predetermined color light source, but it is not limited thereto) corresponding to "the motion trajectory of the touch portion 114" and "the predetermined color light source provided by the touch portion 114" according to "the predetermined color light source provided by the visible light VL generated by the second light-emitting module 1141B" and "the motion trajectory of the touch portion 114 of the input device 110 on the projection screen 140". In other words, when the interactive display system 100 is in the normal operation mode, in this embodiment, the motion trajectory of the touch portion 114 of the input device 120 on the projection screen 140 is projected via the display module 122 of the image interaction module 120, so that track images are generated together with the projected images originally projected by the display module 122 according to the motion trajectory of the touch portion 114.

Further, the touch portion 114 of the input device 110 is arranged with a plurality of replaceable covers 1141C (in this embodiment, merely one replaceable cover 1141C shown in FIGS. 3-4), and one of the replaceable covers 1141C is arranged on the touch portion 114 to cover the first light-emitting module 1141A and the second light-emitting module 1141B. Moreover, the replaceable covers 1141C have different colors. When the replaceable cover 1141C arranged on the touch portion 114 has a predetermined color, the visible light VL generated by the second light-emitting module 1141B passes through the replaceable cover 1141C arranged on the touch portion 114 so as to provide a predetermined color light source corresponding to the predetermined color of the replaceable cover 1141C. For example, if the replaceable cover 1141C arranged on the touch portion 114 is red, and the motion trajectory that the user makes via the input device 110 on the projection screen 140 would show as the screen images of the operation system 130 which are also red. Likewise, if the replaceable cover 1141C arranged on the touch portion 114 is blue, and the motion trajectory that the user makes via the input device 110 on the projection screen 140 would show as the screen images of the operation system 130 which are also blue.

Figure 5:
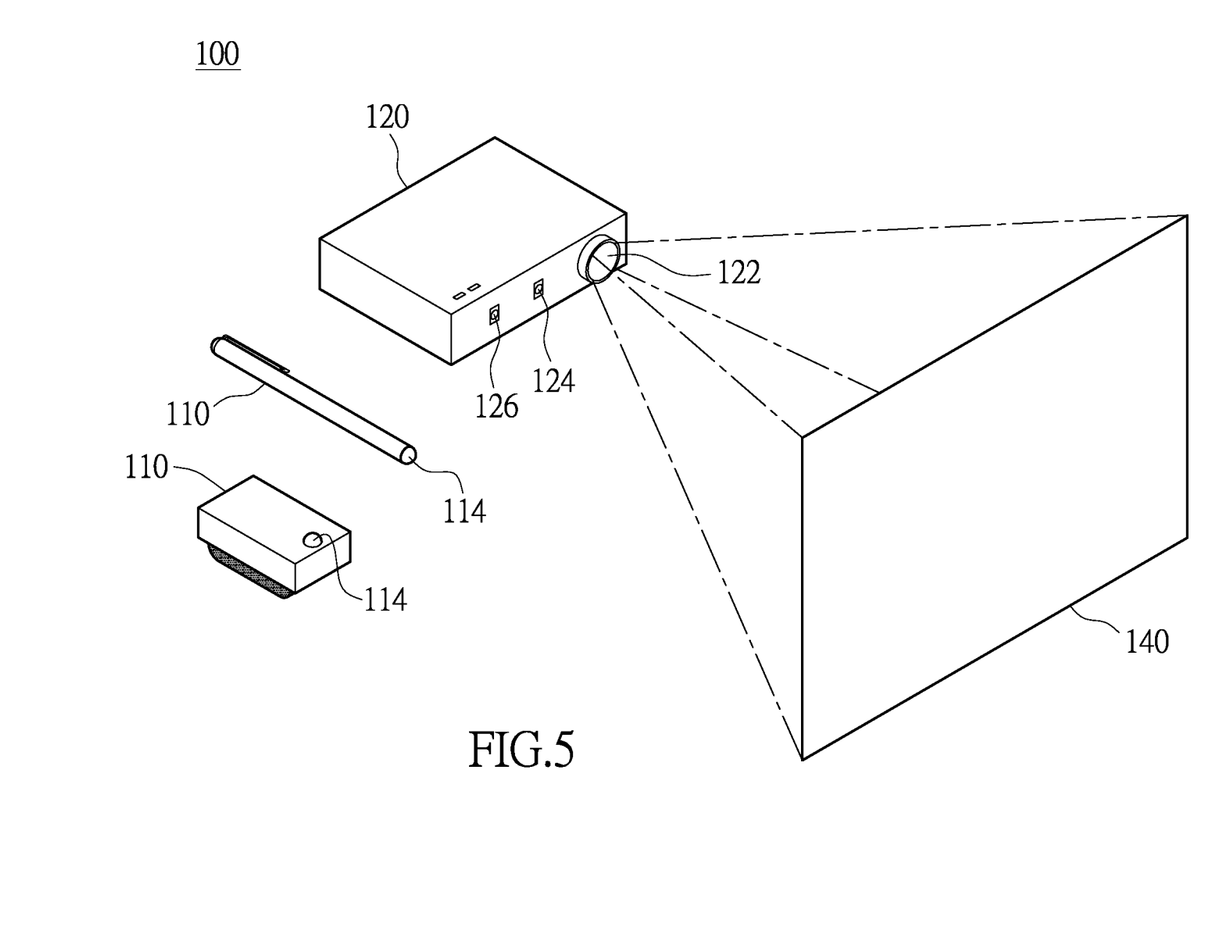
FIG. 5 shows a schematic diagram of an interactive display system using a built-in operation system according to an embodiment of the instant disclosure.
Figure 6:
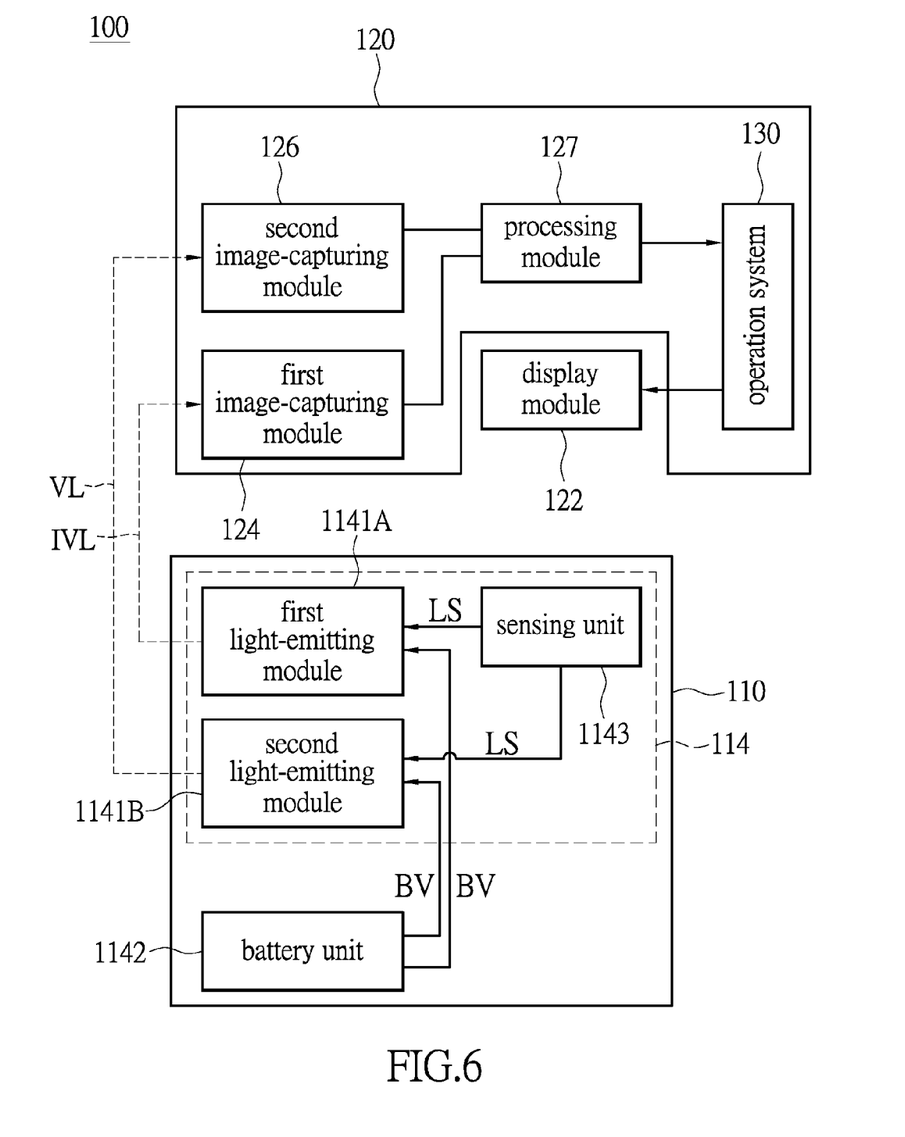
FIG. 6 shows a function block diagram of an interactive display system using a built-in operation system according to an embodiment of the instant disclosure.

In addition, in conjunction with FIGS. 5-6, in addition to the external operation system 130 (as shown in FIGS. 1-2), the built-in operation system 130 can also be used, such as the Android system. The built-in operation system 130 is built inside the image interaction module 120, so that the design of the image interaction module 120 can be modularized, which beautifies the appearance of the interactive display system 100 and also increases the convenience when using the interactive display system 100. In other words, based on different needs of users, the operation system 130 used in the instant disclosure can be an external operation system 130 (such as the Windows system built in the laptop) or a built-in operation system 130 (such as the Android system built in the image interaction module 120), and it is not limited thereto.

To sum up, because of the features that "the touch portion has at least one built-in first light-emitting module for generating invisible light and at least one built-in second light-emitting module for generating visible light" and that "the image interaction module comprises a first image-capturing module for capturing the invisible light generated by the first light-emitting module and a second image-capturing module for capturing the visible light generated by the second light-emitting module", according to "a predetermined color light source provided by the visible light generated by the second light-emitting module" and "a motion trajectory of the touch portion of the input device on the projection screen", the display module of the image interaction module projects a specific function corresponding to "the predetermined color light source provided by the touch portion" and "the motion trajectory of the touch portion" onto the projection screen in the interactive display system and the input device thereof provided by the instant disclosure. For example, the specific function is track images corresponding to the predetermined color light source.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. An interactive display system, comprising:
   a projection screen;
   at least an input device, wherein the input device has a touch portion and the touch portion has at least one built-in first light emitter for generating invisible light and at least one built-in second light emitter for generating visible light, and the input device has a sensing unit connected to the at least one built-in first light emitter and the at least one built-in second light emitter, respectively; wherein the sensing unit of the input device is configured for sensing whether the touch portion of the input device touches a position in an image displayed on the projection screen, and the sensing unit is also configured for triggering the at least one built-in first light emitter to generate the invisible light and for concurrently triggering the at least one built-in second light emitter to generate the visible light if the touch portion touches the projection screen; and
   an image interaction module, comprising a display module, a first image sensor for capturing the invisible light generated by the at least one built-in first light emitter, a second image sensor for capturing the visible light generated by the at least one built-in second light emitter and a processor coupled to the first image sensor and the second image sensor, respectively;
   wherein the processor captures the invisible light generated by the at least one built-in first light emitter via the first image sensor, and determines the position in the image where the touch portion of the input device touches the image according to the invisible light;
   wherein the processor also captures the visible light generated by the at least one built-in second light emitter via the second image sensor, the visible light has a pre-determined specific color, and the processor also recognizes the pre-determined specific color;
   wherein the display module shows a motion trajectory of the touch portion of the input device on the image displayed on the projection screen by projecting a light having the pre-determined specific color on the motion trajectory of the touch portion, and
   wherein the invisible light and the visible light are, substantially, concurrently captured by the first image sensor and the second image sensor.

2. The input device according to claim 1, wherein the touch portion is configured at one terminal of the input device, and the input device is a pen-shaped input device.

3. The interactive display system according to claim 1, wherein the touch portion is configured at one terminal of the input device, and the input device is an eraser-shaped input device.

4. The interactive display system according to claim 1, wherein the touch portion of the input device is arranged with a plurality of replaceable covers and one of the replaceable covers is configured upon the touch portion so as to cover the at least one built-in first light emitter and the at least one built-in second light emitter.

5. The interactive display system according to claim 4, wherein the replaceable covers have different colors, the replaceable cover configured upon the touch portion has a predetermined color, and the visible light generated by the at least one built-in second light emitter passes through the replaceable cover configured upon the touch portion so as to provide the predetermined specific color.

6. An input device, used in an image interaction module, which combines with a projection screen to form an interactive display system, the image interaction module comprises a display module, a first image sensor, a second image sensor, and a processor coupled to the first image sensor and the second image sensor, respectively, wherein the input device is characterized as:
   the input device having a touch portion, and the touch portion having at least one built-in first light emitter for generating invisible light and at least one built-in second light emitter for generating visible light, and the input device having a sensing unit connected to the at least one built-in first light emitter and the at least one built-in second light emitter, respectively; wherein the sensing unit of the input device is configured for sensing whether the touch portion of the input device touches a position in an image displayed on the projection screen, and the sensing unit is also configured for triggering the at least one built-in first light-emitter to generate the invisible light and for concurrently triggering the at least one built-in second light emitter to generate the visible light if the touch portion touches the projection screen;
   wherein the processor captures the invisible light generated by the at least one built-in first light emitter via the first image sensor, and determines the position in the image where the touch portion of the input device touches the image according to the invisible light;
   wherein the processor also captures the visible light generated by the at least one built-in second light emitter via the second image sensor, the visible light has a pre-determined specific color, and the processor also recognizes the pre-determined specific color;
   wherein the display module shows a motion trajectory of the touch portion of the input device on the image displayed on the projection screen by projecting a light having the pre-determined specific color on the motion trajectory of the touch portion, and
   wherein the invisible light and the visible light are, substantially, concurrently captured by the first image sensor and the second image sensor.

7. The input device according to claim 6, wherein the touch portion is configured at one terminal of the input device, and the input device is a pen-shaped input device.

8. The input device according to claim 6, wherein the touch portion is configured at one terminal of the input device, and the input device is an eraser-shaped input device.

9. The input device according to claim 6, wherein the touch portion is arranged with a plurality of replaceable covers and one of the replaceable covers is configured upon the touch portion so as to cover the at least one built-in first light emitter and the at least one built-in second light emitter.

10. The input device according to claim 9, wherein the replaceable covers have different colors, the replaceable cover configured upon the touch portion has a predetermined color, and the visible light generated by the at least one built-in second light emitter passes through the replaceable cover configured upon the touch portion so as to provide the predetermined specific color.

* * * * *